US012036814B2

(12) United States Patent
Bez

(10) Patent No.: US 12,036,814 B2
(45) Date of Patent: Jul. 16, 2024

(54) COLOR LINKER

(71) Applicant: SOCIETE BIC, Clichy (FR)

(72) Inventor: Arnaud Bez, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 106 days.

(21) Appl. No.: 17/619,332

(22) PCT Filed: Jun. 24, 2020

(86) PCT No.: PCT/EP2020/067753
§ 371 (c)(1),
(2) Date: Dec. 15, 2021

(87) PCT Pub. No.: WO2020/260421
PCT Pub. Date: Dec. 20, 2020

(65) Prior Publication Data

US 2022/0297468 A1 Sep. 22, 2022

(30) Foreign Application Priority Data

Jun. 28, 2019 (EP) .................................... 19183423

(51) Int. Cl.
*B43K 23/06* (2006.01)
*B43K 1/00* (2006.01)
(Continued)

(52) U.S. Cl.
CPC .............. *B43K 23/06* (2013.01); *B43K 1/006* (2013.01); *B43K 1/12* (2013.01); *B43K 27/08* (2013.01)

(58) Field of Classification Search
CPC . B43K 1/006; B43K 1/12; B43K 8/02; B43K 8/022; B43K 8/024; B43K 8/026; B43K 8/028; B43K 23/06; B43K 27/08
See application file for complete search history.

(56) References Cited

U.S. PATENT DOCUMENTS

| | | | | |
|---|---|---|---|---|
| 2,130,978 A | | 9/1938 | White | |
| 5,306,092 A | * | 4/1994 | Jenq ....................... | B43K 27/08 401/23 |

(Continued)

FOREIGN PATENT DOCUMENTS

| | | |
|---|---|---|
| CN | 208630166 U | 3/2019 |
| DE | 9401568 U1 | 3/1994 |

(Continued)

OTHER PUBLICATIONS

International Search Report and Written Opinion in International Application No. PCT/EP2020/067753, mailed Aug. 12, 2020 (9 pages).

*Primary Examiner* — David P Angwin
*Assistant Examiner* — Bradley S Oliver
(74) *Attorney, Agent, or Firm* — Bookoff McAndrews, PLLC

(57) ABSTRACT

The application relates to a color linker comprising a base segment including a first portion and a second portion, each of which are configured to allow ink to flow therethrough, and a barrier positioned between the first and second portions, the barrier being configured to prevent the exchange of ink between the first and second portions; a mixing segment adjacent to the base segment, a tip segment adjacent to the mixing segment, and a tip applicator adjacent to the tip segment, the tip applicator being configured to deposit ink onto a writing surface.

20 Claims, 2 Drawing Sheets

(51) Int. Cl.
*B43K 1/12* (2006.01)
*B43K 27/08* (2006.01)

(56) References Cited

U.S. PATENT DOCUMENTS

| | | | | | |
|---|---|---|---|---|---|
| 5,383,736 | A | | 1/1995 | Okulov | |
| 5,388,924 | A | * | 2/1995 | Chao | B43K 27/08<br>401/35 |
| 5,440,327 | A | | 8/1995 | Stevens | |
| 5,911,533 | A | | 6/1999 | Fassler et al. | |
| 5,971,643 | A | * | 10/1999 | Ahmed | B43K 27/00<br>401/44 |
| 6,474,888 | B1 | | 11/2002 | Lapstun et al. | |
| 6,715,950 | B2 | * | 4/2004 | Kim | B43K 27/08<br>401/35 |
| 6,749,355 | B2 | | 6/2004 | Payne et al. | |
| 6,981,768 | B2 | | 1/2006 | Saksa et al. | |
| 7,850,385 | B2 | | 12/2010 | Noguchi | |
| 8,403,577 | B2 | | 3/2013 | Khoshnevis | |
| 9,862,224 | B1 | | 1/2018 | Maresh | |
| 2006/0244805 | A1 | | 11/2006 | Yeh | |
| 2009/0257811 | A1 | | 10/2009 | Brachman | |
| 2010/0061793 | A1 | | 3/2010 | Bender et al. | |
| 2018/0126342 | A1 | | 5/2018 | Kent | |

FOREIGN PATENT DOCUMENTS

| | | | |
|---|---|---|---|
| GB | 2277253 | A | 10/1994 |
| WO | 2019077262 | A1 | 4/2019 |

* cited by examiner

COLOR LINKER

CROSS REFERENCE TO RELATED APPLICATIONS

This application is a National Stage Application of International Application No. PCT/EP2020/067753, filed on 24 Jun. 2020, now published as WO2020260421A1 and which claims priority from EP19183423.3, filed on 28 Jun. 2019, the entire contents of which is incorporated herein by reference.

BACKGROUND

1. Field

The following description relates to an ink mixing assembly including a color linker, and more particularly to color linker configured to mix inks and deposit the mixed ink onto a writing surface.

2. Description of Related Art

Conventional mixable ink systems that allow a user to use one writing instrument while having the ability to use different colors of ink typically use a replaceable and/or refillable ink cartridge. A refillable ink cartridge can be attached to a separate device having a plurality of reservoirs of ink. The cartridge can be filled with a custom combination of inks to achieve a desired color and then cartridge may be inserted into the writing instrument. See, for example, WO 2019/077262. Also, U.S. Pat. No. 5,911,533 discloses a compact, low power, portable, microfluidic pen to write all different color hues on a suitable receiver.

A common drawback of conventional ink mixing systems is that they are complex and difficult to use. Additionally, they have a lot of components and can be expensive.

SUMMARY

The present disclosure provides a color linker comprising a base segment including a first portion and a second portion, each of which are configured to allow ink to flow therethrough, and a barrier positioned between the first and second portions, the barrier being configured to prevent the exchange of ink between the first and second portions; a mixing segment adjacent to the base segment, the mixing segment including a first portion and a second portion, each of which are configured to allow ink to flow therethrough, wherein the first and second portions have an angular offset relative to the first and second portions of the base segment; a tip segment adjacent to the mixing segment, the tip segment including a first portion and a second portion, each of which are configured to allow ink to flow therethrough, wherein the first and second portions have an angular offset relative to the first and second portions of the mixing segment, and a tip applicator adjacent to the tip segment, the tip applicator being configured to deposit ink onto a writing surface.

Due to the configuration of the color linker, the ink cannot be mixed radially due to the barrier. The inks are mixed with the mixing segment because it links first and second portions of the base segment. This configuration improves the mixing capabilities of the color linker and presents unwanted backflow between color discharge devices.

The color linker may comprise sintered polymer powder or foam with open porosity interconnected or a rod of pultruded fibers with any shape or non-woven felt.

The barrier may be hydrophobic.

The angular offset of the first and second portions of the mixing segment relative to the first and second portions of the base segment may be within a range of 5 deg to 175 deg. More specifically, the angular offset of the first and second portions of the mixing segment relative to the first and second portions of the base segment may be within a range of 60 deg to 120 deg and even more specifically 80 deg to 100 deg. In particular the angular offset contributes to enhance the adequate mixing of the ink.

The angular offset of the first and second portions of the mixing segment relative to the first and second portions of the base segment may be 90 deg.

A cross-section of the tip applicator may have a circular shape.

The cross-section of the tip applicator may have a rectangular cross shape.

Each of the base segment, mixing segment, and tip segment may have a circular cross-section. Each of the base segment, mixing segment, and tip segment may have any parallelepipedal cross-section.

The cross section of each of the first and second portions of the respective base segment, mixing segment, and tip segment may have any semi-parallelepipedal shape.

The cross section of each of the first and second portions of the respective base segment, mixing segment, and tip segment may have a semi-circular shape.

In embodiments, an ink mixing assembly comprises the aforementioned color linker and a casing attached to the base segment, mixing segment, and tip segment, wherein the casing may be configured to receive a first ink discharge device and a second ink discharge device.

The casing may be configured to hold a tip of the first ink discharge device onto the first portion of the base segment and is further configured to hold a tip of the second ink discharge device into the second portion of the base segment.

The capillary action of the porous color mixer is lower to a conventional tip applicator. The porous color mixer can adequately mix multiple colors together and due to the capillary action of the porous color mixer, it is lower to a conventional tip applicator at mixing colors and depositing the mixed ink. Additionally, this configuration reduces the risk of back pollution, e.g. color form one marker enters into the other marker.

The above summary is not intended to describe each and every implementation of the concept. In particular, selected features of any illustrative embodiment within this disclosure may be incorporated into additional embodiments unless clearly stated to the contrary.

BRIEF DESCRIPTION OF THE DRAWINGS

The disclosure may be more completely understood in consideration of the following detailed description of aspects of the disclosure in connection with the accompanying drawings, in which.

DETAILED DESCRIPTION

Figure 1:
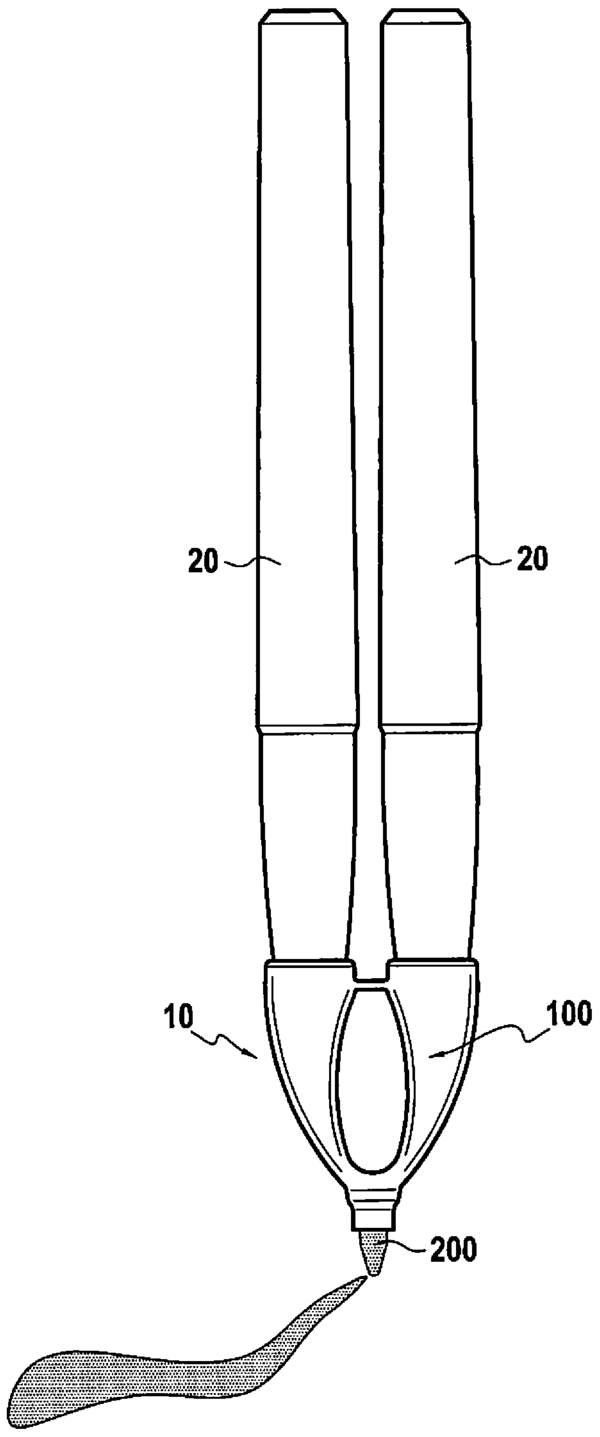
FIG. 1 details an ink mixing assembly.

FIG. 1 shows an ink mixing assembly 10. The ink mixing assembly 10 may be configured to mix two or more inks.

The inks may be contained within ink discharge devices 20. An ink discharge device 20 may be, for example, a coloring felt pen. Although the ink mixing assembly 10 shown includes two ink discharge devices 20, the ink mixing assembly 10 may be configures to receive more than two ink discharge devices 20.

The color mixing assembly may include a casing 100 which may be a polymer or any other suitable material, for example, metal. The casing 100 may have openings 110 (not shown) that are configured to receive an ink discharge device 20. Partially enclosed within the casing 100 may be a color linker 200.

Figure 2:
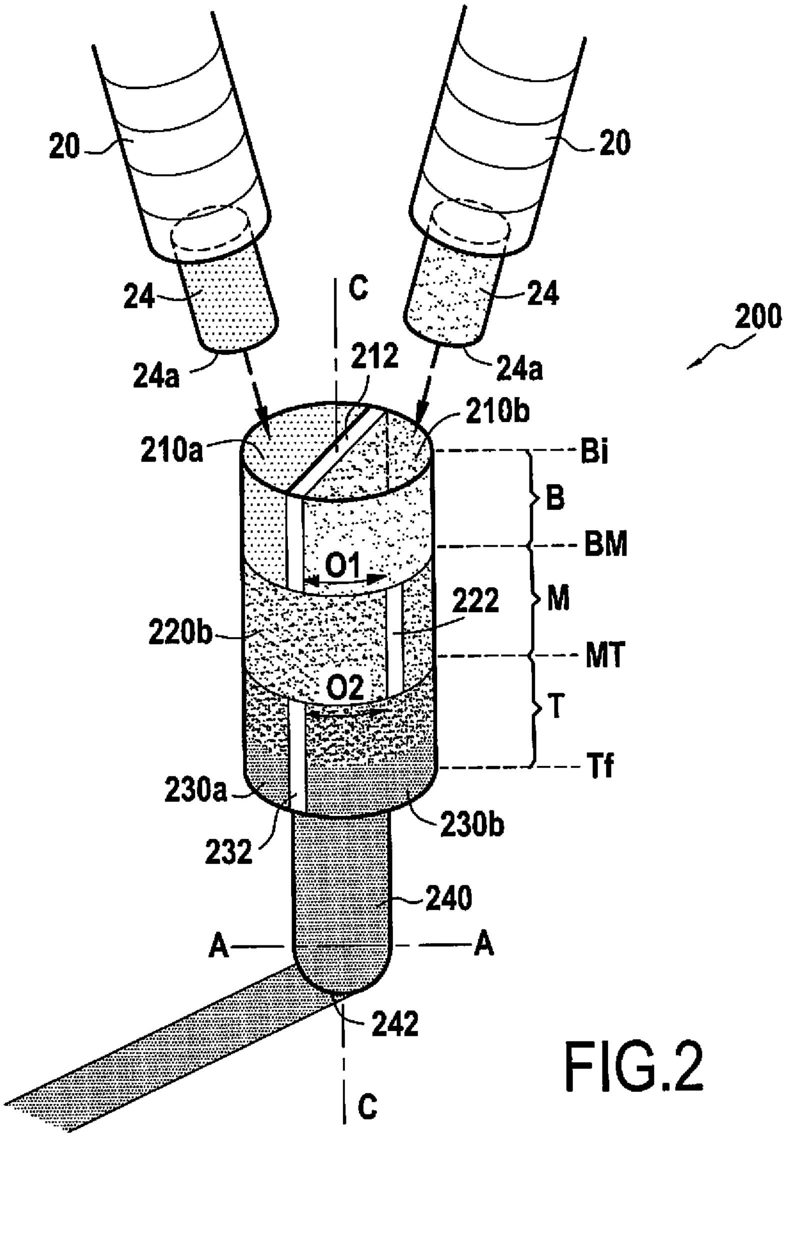
FIG. 2 details a color linker.

FIG. 2 shows the interaction between a color linker 200 and ink discharge devices 20 without the casing 100.

An ink discharge device 20 may include a quantity of ink therein. The ink may be in contact with an ink transfer element 24, which may be sintered polymer powder or foam with open porosity interconnected or a rod of pultruded fibers with any shape or non-woven felt. The ink transfer element 24 may include a tip 24*a*. The tip 24*a* may be sintered polymer powder or foam with open porosity interconnected or a rod of pultruded fibers with any shape or non-woven felt. The tip 24*a* may be configured to deposit ink onto a writing surface. A writing surface, may be, for example, a piece of paper, cardboard, or any other surface where the ink may be deposited.

The color linker 200 may be formed of a sintered polymer powder or foam with open porosity interconnected or a rod of pultruded fibers with any shape or non-woven felt or any combination thereof. The porous color linker 200 may include a tip applicator 240, tip segment T, mixing segment M, and base segment B.

The base segment B may comprise a first portion 210*a* configured to contact the tip 24*a* of a first ink discharge device 20 and a second portion 210*b* configured to contact a tip 24*a* of a second ink discharge device 20.

The first and second portions 210*a*, 210*b* may be separated by a barrier 212 configured to prevent the cross-flow of ink. The barrier 212 may include a hydrophobic film or coating. The cross-section of each of the first and second portions may be semi-circles. The base segment B may form a surface Bi which is configured to intact at least one of the ink discharge devices 20.

The base segment B may be defined as the portion of the color linker 200 from surface Bi which is disposed within the casing 100 and in contact with at least one of the ink discharge devices 20 to the mixing interface BM where the mixing segment M begins.

The ink that is in the first and second ink discharges devices 20 may to transferred through the base segment B by capillary action.

The ink then may be transferred into the mixing segment M which is adjacent to the base segment B. The mixing segment M may have the exact same or substantially similar structure as the base segment B, therefore like reference symbols will be used.

The mixing segment M may be rotationally offset about a center axis C from the base segment B. In this manner, the barrier 212 of the base segment B and barrier 222 of mixing segment M may be positioned in planes that intersect. For example, the mixing segment M may have an rotational offset O1 such that the respective barriers have a rotational offset O1 in a range of 5 deg to 175 deg, specifically in a range of 60 deg to 120 deg, even more specifically 80 deg to 100 deg, optionally of about 90 deg. Due to the rotational offset O1 of the mixed segment M, the mixed segment is configured to mix the ink that is received from the first and second portions 210*a*, 210*b*, of the base segment B. It has been observed that the value of the rotational offset O1 contributes to enhance the adequate mixing of the ink, in particular in the ranges stated above. The mixing segment M may be defined as the portion of the color linker 200 between the mixing interface BM and the tip interface MT.

Thereafter, the mixed ink may be transferred into the tip segment T which is adjacent to the mixing segment M. The tip segment T may have the exact same or substantially similar structure as the base segment B and mixing segment M, therefore like reference symbols will be used.

The tip segment T may be configured to further mix the ink and/or transfer the mixed ink to the tip applicator 240. Similar to the mixing segment M, the tip segment T may be rotationally offset about a center axis C from the mixing segment M. In this manner, the barrier 222 of the mixing segment M and barrier 232 of mixing segment M may be positioned in planes that intersect. For example, the tip segment T may have an rotational offset O2 such that the respective barriers have a rotational offset O2 in a range of 5 deg to 175 deg, specifically in a range of 60 deg to 120 deg, even more specifically 80 deg to 100 deg, optionally of about 90 deg. Due to the rotational offset O2 of the tip segment T, the tip segment T is configured to further mix the ink that is received from the mixed segment M. It has been observed that the value of the rotational offset O2 contributes to enhance the adequate mixing of the ink, in particular in the ranges stated above. The tip segment T may be defined as the portion of the color linker 200 between the tip interface MT and the tip applicator interface Tf.

A tip applicator 240, which is adjacent to the tip segment T, may be configured to deposit indicia, or the mixed ink, on a writing surface. The tip applicator 240 may include sintered powder of fiber A cross-section of the tip taken along plane A-A may be circular. However, it is envisioned that the cross-section may be oval or rectangular or any other shape from extruded process or any other shape from sintered powder process.

Due to the similar structure of the base segment B, mixing segment M, and tip segment T, all of the segments may be manufactured as a unit, e.g., extruded. After which, the extruded component may be cut into the discrete segments and rotated relative to each other to have a predetermined rotational offset.

Although the color linker is described herein as having a base segment, mixing segment, tip segment, and tip applicator; it is also envisioned that the color linker may not include the tip segment. That is, the color linker is configured to deposit mixed ink without the tip segment. However, the addition of the tip segment helps to mix the inks to a more uniform consistency.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure. Additionally, any of the features of the described embodiments are combinable when not conflicting.

It is intended that the specification and examples be considered as exemplary only, with a true scope of the disclosure being indicated by a fair reading of the following claims.

The invention claimed is:

1. A color linker comprising:

a base segment including a first portion and a second portion, each of which are configured to allow ink to flow therethrough, and a barrier positioned between the first and second portions of the base segment, the barrier being configured to prevent the exchange of ink between the first and second portions of the base segment;

a mixing segment adjacent to the base segment, the mixing segment including a first portion and a second portion, each of which are configured to allow ink to flow therethrough, and a barrier positioned between the first and second portions of the mixing segment, the barrier being configured to prevent the exchange of ink between the first and second portions of the mixing segment, wherein the first and second portions of the mixing segment have an angular offset relative to the first and second portions of the base segment such that the ink from the first portion of the base segment mixes with the ink from the second portion of the base segment in the mixing segment;

a tip segment adjacent to the mixing segment, the tip segment including a first portion and a second portion, each of which are configured to allow ink to flow therethrough, wherein the first and second portions of the tip segment have an angular offset relative to the first and second portions of the mixing segment, and a tip applicator adjacent to the tip segment, the tip applicator being configured to deposit ink onto a writing surface.

2. The color linker according to claim 1 comprises sintered polymer powder or foam with open porosity interconnected or a rod of pultruded fibers with any shape or non-woven felt.

3. An ink mixing assembly comprising:

the color linker of claim 2; and a casing attached to the base segment, mixing segment, and tip segment, wherein the casing is configured to receive a first ink discharge device and a second ink discharge device.

4. The color linker according to claim 1, wherein the barrier is hydrophobic.

5. An ink mixing assembly comprising:

the color linker of claim 4; and a casing attached to the base segment, mixing segment, and tip segment, wherein the casing is configured to receive a first ink discharge device and a second ink discharge device.

6. The color linker of claim 1, wherein angular offset of the first and second portions of the mixing segment relative to the first and second portions of the base segment is within a range of 5 deg to 175 deg.

7. An ink mixing assembly comprising:

the color linker of claim 6; and a casing attached to the base segment, mixing segment, and tip segment, wherein the casing is configured to receive a first ink discharge device and a second ink discharge device.

8. The color linker of claim 1, wherein angular offset of the first and second portions of the mixing segment relative to the first and second portions of the base segment is within a range of 60 deg to 120 deg.

9. An ink mixing assembly comprising:

the color linker of claim 8; and a casing attached to the base segment, mixing segment, and tip segment, wherein the casing is configured to receive a first ink discharge device and a second ink discharge device.

10. The color linker of claim 1, wherein angular offset of the first and second portions of the mixing segment relative to the first and second portions of the base segment is within a range of 80 deg to 100 deg.

11. The color linker of claim 1, wherein angular offset of the first and second portions of the mixing segment relative to the first and second portions of the base segment is 90 deg.

12. The color linker of claim 1, wherein a cross-section of the tip applicator has a circular shape.

13. The color linker of claim 1, wherein a cross-section of the tip applicator has a rectangular shape.

14. The color linker of claim 1, wherein each of the base segment, mixing segment, and tip segment have a circular cross-section.

15. The color linker of claim 1, wherein each of the base segment, mixing segment, and tip segment have any parallelepipedal cross-section.

16. The color linker of claim 1, wherein the cross section of each of the first and second portions of the respective base segment, mixing segment, and tip segment have a semicircular shape.

17. The color linker of claim 1, wherein the cross section of each of the first and second portions of the respective base segment, mixing segment, and tip segment have any semiparallelepipedal shape.

18. An ink mixing assembly comprising:

the color linker of claim 1; and a casing attached to the base segment, mixing segment, and tip segment, wherein the casing is configured to receive a first ink discharge device and a second ink discharge device.

19. The ink mixing assembly of claim 18, wherein the casing is configured to hold a tip of the first ink discharge device onto the first portion of the base segment and is further configured to hold a tip of the second ink discharge device into the second portion of the base segment.

20. The color linker according to claim 1, wherein the tip segment is configured to mix the ink from the first portion of the tip segment with the ink from the second portion of the tip segment within the tip segment.

* * * * *